May 25, 1954

A. FISCHBACH ET AL 2,679,547

THIN PLATE BATTERY

Filed Jan. 9, 1951

INVENTORS
ADOLPH FISCHBACH
DAVID LINDEN

BY

*Harry M. Saragovitz*
Attorney

Patented May 25, 1954

2,679,547

UNITED STATES PATENT OFFICE 2,679,547

THIN PLATE BATTERY

Adolph Fischbach, Allenhurst, and David Linden, Red Bank, N. J., assignors to the United States of America as represented by the Secretary of the Army Application January 9, 1951, Serial No. 205,166

1 Claim. (Cl. 136—90)

(Granted under Title 35, U. S. Code (1952), sec. 266)

The invention described herein may be manufactured and used by or for the Government for governmental purposes, without the payment of any royalty thereon.

This invention relates to multiple cell, deferred action type, meteorological batteries adapted for quick activation by "dunking" into an electrolyte, and more particularly to such batteries utilizing the electrochemical system lead-acid-lead peroxide.

Early meteorological radio-sonde transmitters were powered with Leclanche type dry batteries which, although easily put into operation, had poor shelf life, poor low temperature and poor high discharge characteristics. The advent of high altitude flights made the power requirements for radio-sonde transmitters and other special purpose applications more stringent; higher voltage batteries were required to supply higher currents for longer periods of time, even at very low temperatures.

It is an object of the invention to provide a low cost, extremely lightweight, meteorological battery with superior low temperature and high rate discharge characteristics (high capacity per unit of weight and volume). Briefly stated, this and other objects of the invention are achieved by utilizing, in a new manner, the well known system lead-sulphuric acid-lead peroxide, which system hitherto has been used only in secondary or storage batteries. The grids supporting the active material of the electrodes in such known storage batteries are cast from lead or lead alloys and are designed to lock the active material in place. For various reasons (conductivity, uniform current distribution, preventing the active material from buckling or crumbling) the grids of these known storage batteries have been made relatively strong and even small size secondary batteries have been constructed with only such heavy grids. It has been found, however, that a marked reduction in the weight of grids may be achieved without impairing the quality of the battery by depositing or pasting the active material in grids consisting of an extremely lightweight gauze, net or screen made of very thin metal wires.

The invention will become more apparent from the following description and accompanying drawing taken in connection with the appended claim.

Figure 1:
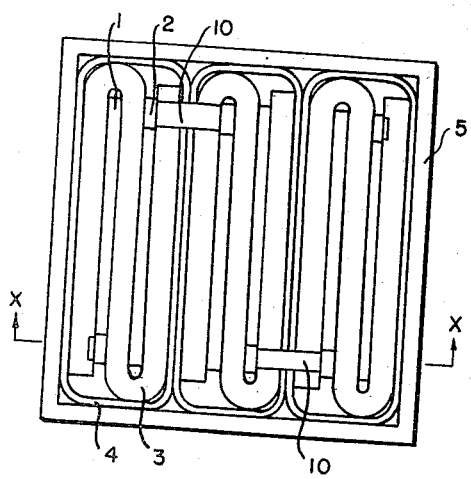
Fig. 1 is a top view of a battery according to the invention, consisting of three cells.
Figure 2:
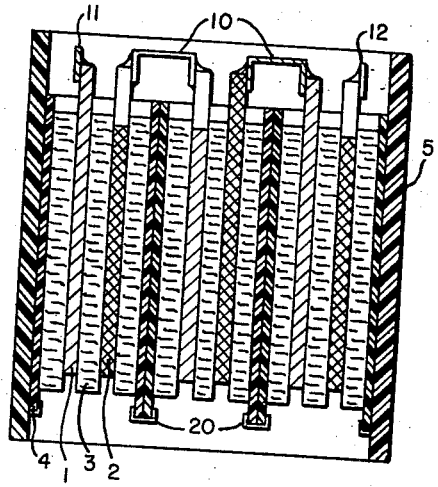
Fig. 2 is an enlarged sectional view taken along line X—X of Fig. 1.

Referring to Figs. 1 and 2, each of the three cells comprises two thin, flat, plate electrodes, one a negative sponge lead electrode 1 and the other a positive lead peroxide electrode 2. The electrodes 1 and 2 are made by pasting, in well known manner, oxides of lead on to a supporting grid.

Figure 3:
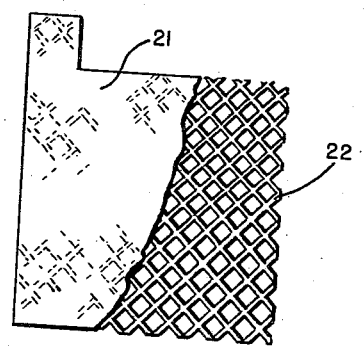
Fig. 3 is an elevational view of an electrode according to the invention, with the active electrodic material partly removed.

According to the present invention, this grid consists of a gauze, net or screen made of very thin metal wire such as copper, silver, nickel, aluminum or the like. Fig. 3 shows an electrode according to the invention with the active electrodic material 21 partly removed in order to show the wire screen 22 into which the electrodic material is pasted. The wire of the screen 22 may be as thin as 0.01 inch or less. The thickness of a screen is about double the thickness of the wire used to weave the screen; it is, however, possible to press the screen down almost to the thickness of a single wire. If, therefore, extremely thin grids are to be used, the screens are pressed after weaving. Various wire screens, e. g., 16/16 or 45/45 mesh, using various wire thicknesses up to 0.02 inch and more have been satisfactorily used. Finished pasted electrodes, with less than about 0.04 inch thickness and of extreme lightweight, can thus be made showing sufficient mechanical strength and adequate electric characteristics.

If copper wire is used it is advantageous to electro-plate the wire with a protective and impervious coating of lead, lead-peroxide, manganese or other coatings which prevent corrosion or dissolution of the metal by the acid electrolyte. The screen may or may not be pressed before the protective coating is put on.

If the copper screen were not protected some copper might go into the solution and plate out on the other electrode, making local couples and causing the cell to deteriorate. The copper grid of the negative sponge lead plate does not have to be coated, provided the battery is used as a "one-shot" battery, that is, discarded after initial use.

After pasting the lead oxide into grids of the above-described character, the plates are dried, formed and dry-charged in the usual manner.

A spacer 3 of bibulous sheet material surrounds both electrodes laterally, thus separating the electrodes 1, 2, from each other and from the insulating sheet material which constitutes the hull 4 of the cell. This hull or cell container 4 holds the elements of the electrode-spacer structure laterally together under pressure contact but leaves top and bottom of the electrode-spacer structure open. The bibulous spacer 3 may consist of paper, wood-pulp, microporous rubber, glass wool or other liquid retaining materials, inert to the action of the acid electrolyte. The thickness of the spacer 3 is designed to soak up enough electrolyte (not shown) to allow complete utilization of the active material of the electrodes 1, 2.

The cell hull 4 consists of suitable plastic sheet material such as polystyrene, various poly-vinyl resins, synthetic rubber or other elastomers, Scotch tape, etc. A plurality of such cells in juxtaposition can be easily and tightly packaged, for instance, in an open frame structure or battery frame 5 which surrounds the cells laterally and is of such inner dimensions that the desired number of cells are closely and immovably held together. The battery frame 5 may consist of any of the materials used for the cell hull 4 as enumerated above. Metal tabs 10 electrically connect successive cells in conventional manner; the positive electrode of one end cell and the negative electrode of the other end cell each being provided, respectively, with a positive terminal 11 and a negative terminal 12.

To activate the above-described battery, it is immersed partially into sulphuric acid or fluoroboric acid electrolyte for about one to three minutes, depending on the size of the battery and the nature of the bibulous material of the spacers 3. After this time, the battery is withdrawn from the liquid electrolyte, shaken to remove excess liquid and is then ready for use.

In order to prevent accumulation of liquid electrolyte at the lower edges of the cell container 4, a film 20 of water repellent substance, e. g., petroleum jelly, silicone resins or the like is painted on the lower portions of the sheet material constituting the cell container 4. This film 20 prevents leakage currents which otherwise would follow the electrolyte film accumulated on the lower edges of the hull 4.

While the invention has been described in connection with a specific embodiment of a "one-shot" battery, it is understood that other structures and also rechargeable batteries of limited rechargeability can be obtained by using electrodes constructed with the help of grids made according to the invention.

We claim:

An extremely lightweight, deferred action type meteorological battery capable of high discharge rates in relation to weight and size of said battery comprising thin, flat cells, said cells each comprising thin, flat, lead anodes and thin, flat, lead-peroxide cathodes, the electrodic material of said electrodes being supported by a metal screen made from wire of less than about 0.03" thickness, said meteorological battery being of limited rechargeability.

References Cited in the file of this patent

UNITED STATES PATENTS

| Number | Name | Date |
|---|---|---|
| 1,078,380 | Reynolds | Nov. 11, 1913 |
| 1,321,947 | Sperry | Nov. 18, 1919 |
| 2,349,763 | Setzer | May 23, 1944 |
| 2,564,495 | Mullen | Aug. 14, 1951 |
| 2,636,060 | Fischbach et al. | Apr. 21, 1953 |
| 2,640,863 | Ellis | June 2, 1953 |

FOREIGN PATENTS

| Number | Country | Date |
|---|---|---|
| 10,448 | Great Britain | of 1895 |